United States Patent
Courtright, II et al.

[19]

[11] Patent Number: 6,157,963

[45] Date of Patent: Dec. 5, 2000

[54] SYSTEM CONTROLLER WITH PLURALITY OF MEMORY QUEUES FOR PRIORITIZED SCHEDULING OF I/O REQUESTS FROM PRIORITY ASSIGNED CLIENTS

[75] Inventors: William V. Courtright, II; William P. Delaney; Gerald J. Fredin, all of Wichita, Kans.

[73] Assignee: LSI Logic Corp., Milpitas, Calif.

[21] Appl. No.: 09/047,251

[22] Filed: Mar. 24, 1998

[51] Int. Cl.[7] .................................................. G06F 13/00
[52] U.S. Cl. ................................. 710/5; 710/5; 710/40; 364/200
[58] Field of Search .............................. 710/5, 6, 40, 74, 710/23, 44; 395/495, 725, 115; 364/200

[56] References Cited

U.S. PATENT DOCUMENTS

| | | | |
|---|---|---|---|
| 3,725,864 | 4/1973 | Clark et al. | 340/172.5 |
| 4,858,108 | 8/1989 | Ogawa et al. | 364/200 |
| 4,901,232 | 2/1990 | Harrington et al. | 364/200 |
| 4,980,820 | 12/1990 | Youngblood | 364/200 |
| 5,008,808 | 4/1991 | Fries et al. | 364/200 |
| 5,303,382 | 4/1994 | Buch et al. | 395/725 |
| 5,327,526 | 7/1994 | Nomura et al. | 395/115 |
| 5,394,548 | 2/1995 | Nakajima et al. | 395/650 |
| 5,426,736 | 6/1995 | Guineau, III | 395/250 |
| 5,450,564 | 9/1995 | Hassker et al. | 395/495 |
| 5,455,934 | 10/1995 | Holland et al. | 395/404 |
| 5,463,743 | 10/1995 | Galloway | 395/285 |
| 5,481,707 | 1/1996 | Murphy, Jr. et al. | 395/650 |
| 5,544,329 | 8/1996 | Engel et al. | 395/826 |
| 5,623,672 | 4/1997 | Popat | 395/725 |
| 5,717,942 | 2/1998 | Haupt et al. | 395/800 |
| 5,875,472 | 2/1999 | Bauman et al. | 711/150 |

*Primary Examiner*—Thomas C. Lee
*Assistant Examiner*—Chun Cao

[57] ABSTRACT

A system for globally prioritizing and scheduling I/O requests from a plurality of storage users or clients to one or more storage objects. The system comprises a storage controller configured to receive I/O requests from the client workstations and prioritize and schedule those I/O requests in accordance with a scheduling algorithm. Specifically, the storage controller receives I/O requests from the storage users and places the I/O requests in memory queues associated with the particular storage users. The storage controller then selects the I/O requests from the various memory queues based on the scheduling algorithm.

29 Claims, 5 Drawing Sheets

| SEQUENCE | UP1 | P1 | UP2 | P2 | UP3 | P3 | SELECTION |
|---|---|---|---|---|---|---|---|
| 1 | 0.0 | 8.0 | 0.0 | 9.0 | 0.0 | 10.0 | P1 |
| 2 | 1.0 | 9.0 | 0.0 | 9.0 | 0.0 | 10.0 | P2 |
| 3 | 1.0 | 9.0 | 1.0 | 10.0 | 0.0 | 10.0 | P1 |
| 4 | 2.0 | 10.0 | 1.0 | 10.0 | 0.0 | 10.0 | P3 |
| 5 | 2.0 | 10.0 | 1.0 | 10.0 | 1.0 | 11.0 | P2 |
| 6 | 2.0 | 10.0 | 2.0 | 11.0 | 1.0 | 11.0 | P1 |
| DECAY | 3.0 | 11.0 | 2.0 | 11.0 | 1.0 | 11.0 | N/A |
| 7 | 2.3 | 10.3 | 1.5 | 10.5 | 0.8 | 10.8 | P1 |
| 8 | 3.3 | 11.3 | 1.5 | 10.5 | 0.8 | 10.8 | P2 |
| 9 | 3.3 | 11.3 | 2.5 | 11.5 | 0.8 | 10.8 | P3 |
| 10 | 3.3 | 11.3 | 2.5 | 11.5 | 1.8 | 11.8 | P1 |
| 11 | 4.3 | 12.3 | 2.5 | 11.5 | 1.8 | 11.8 | P2 |
| 12 | 4.3 | 12.3 | 3.5 | 12.5 | 1.8 | 11.8 | P3 |
| DECAY | 4.3 | 12.3 | 3.5 | 12.5 | 2.8 | 12.8 | N/A |
| 13 | 3.2 | 11.2 | 2.6 | 11.6 | 2.1 | 12.1 | P1 |
| 14 | 4.2 | 12.2 | 2.6 | 11.6 | 2.1 | 12.1 | P2 |
| 15 | 4.2 | 12.2 | 3.6 | 12.6 | 2.1 | 12.1 | P3 |
| 16 | 4.2 | 12.2 | 3.6 | 12.6 | 3.1 | 13.1 | P1 |

*FIG._6*

SYSTEM CONTROLLER WITH PLURALITY OF MEMORY QUEUES FOR PRIORITIZED SCHEDULING OF I/O REQUESTS FROM PRIORITY ASSIGNED CLIENTS

BACKGROUND OF THE INVENTION

The present invention relates generally to methods and apparatus for scheduling I/O requests and specifically to a system for scheduling I/O requests from workstations to one or more particular storage objects.

A large number of distributed network environments typically comprise a number of client workstations networked to one or more centralized storage locations, such as, file servers or disk array subsystems. File servers typically comprise PC or RISC-processor workstations equipped with high storage capacity disk drives. Similarly, disk array subsystems typically comprise one or more disk arrays, for example, RAID arrays, and one or more array controllers attached thereto. The client workstations may be connected to the file servers and/or disk array controllers either through an I/O interconnect, such as SCSI bus, Fibre Channel or other similar I/O connection or the workstation may be connected through a network environment, such as Ethernet, Token Ring, FDDI/CDDI or the like.

It is not unusual in large networks to have a large number of users/clients accessing only a few storage locations in one or more storage objects. During busy times on the network, I/O requests to the various storage locations can become backed-up, causing undesirable response delays for many of the users.

In many business environments, certain users may be performing tasks which require quicker response times than tasks initiated by other users, or it may be desirable for certain users to have a priority higher than other users. In addition, certain data types requiring higher access priorities (e.g., a virtual memory swap volume) may be dedicated to specific disk drives or disk volumes, thus requiring all I/O requests directed to those specific volumes to be processed first. Unfortunately, however, the current disk storage interfaces (i.e., file server processors and/or array controllers) do not provide means for the global scheduling of I/O requests to one or more file servers or disk drive arrays, and therefore only can process I/O requests on a first come, first served basis. In addition, the disk storage interfaces currently known in the art do not have means for resolving contention issues between users, so if one user submits a plurality of I/O requests at one time, requests from other users can become blocked behind the I/O requests of that one user. Thus, higher priority I/O requests can be starved of resources and undesirably delayed.

SUMMARY OF THE INVENTION

Accordingly, it is an advantage of the present invention to provide methods and apparatus for scheduling I/O requests to one or more disk drives or arrays which overcome the shortcomings of the prior art.

Another advantage of the present invention is that any number of different types of storage controllers may be embodied in the present invention, such as, disk array controllers, file server controllers, and the like.

Yet another advantage of the present invention is that it may use any one of a number of different prioritization and scheduling schemes currently known in the art or hereinafter developed.

Yet another advantage of the present invention is that the prioritization and scheduling scheme may be configured to change priority values assigned to memory queues, clients, storage objects, or the like to ensure that certain I/O requests placed in lower priority memory queues or originating from lower priority clients are not starved of processor resources.

Still another advantage of the present invention is that it may be used in a number of different computer system configurations or network environments and topologies, such as I/O connections like SCSI or Fibre Channel, for example, or network environments like Ethernet, token ring, FDDI/CDDI to name a few.

The above and other advantages of the present invention are carried out in one form by a storage controller configured to prioritize and schedule I/O requests from a plurality of clients to at least one storage object. The storage controller suitably comprises a processing means for processing the I/O requests, a first interface means for sending and receiving data between the clients and the processing means, and a second interface means for sending and receiving data between the processing means and the storage objects.

Preferably, the processing means is configured to receive I/O requests from the clients via the first interface means, prioritize and schedule the I/O requests in accordance with a priority algorithm, and conduct an I/O operation with the storage objects via the second interface means for an I/O request having a preselected priority. After the I/O operation is complete, the processor communicates the results back to the client that initiated the I/O request.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DESCRIPTION OF THE PREFERRED EMBODIMENT

The present invention is a method and apparatus for receiving, prioritizing, scheduling and processing I/O requests from a plurality of storage users or clients to one or more storage objects, where each storage object preferably is under the control of a central storage controller. For example, a suitable storage controller may be a block-access type storage device such as a disk controller or RAID storage controller. In such a case, the storage users or clients are host systems connected to the storage controller via an I/O interconnect such as a SCSI bus, Fibre Channel, or other suitable communication interface. The storage objects would typically be SCSI logical units, for example. In an alternative embodiment, the storage controller may be a network-based file server. In such a case, the storage users would be network-attached file access clients using network protocols such as Sun Microsystem's Network File System (NFS), Microsoft's Server Message Block (SMB) protocol or the like. The network attachment could be based on an Ethernet, FDDI/CDDI, Token Ring, or any suitable communication backbone. The storage objects typically would be the file systems exported by the file server to its clients. In any event, the methods and apparatus disclosed and claimed herein may be embodied in any suitable control device with any suitable communication scheme for conveying requests from the storage users to the storage controller. Accordingly, the present invention is not limited to the specific embodiments illustrated in the figures or disclosed herein.

In the Figures, similar components and/or features have the same reference label. Various components of the same type are distinguished by following the reference label by a dash and a second label that distinguishes among the similar components. If only the first reference label is used, the description is applicable to any one of the several similar components.

Figure 1:
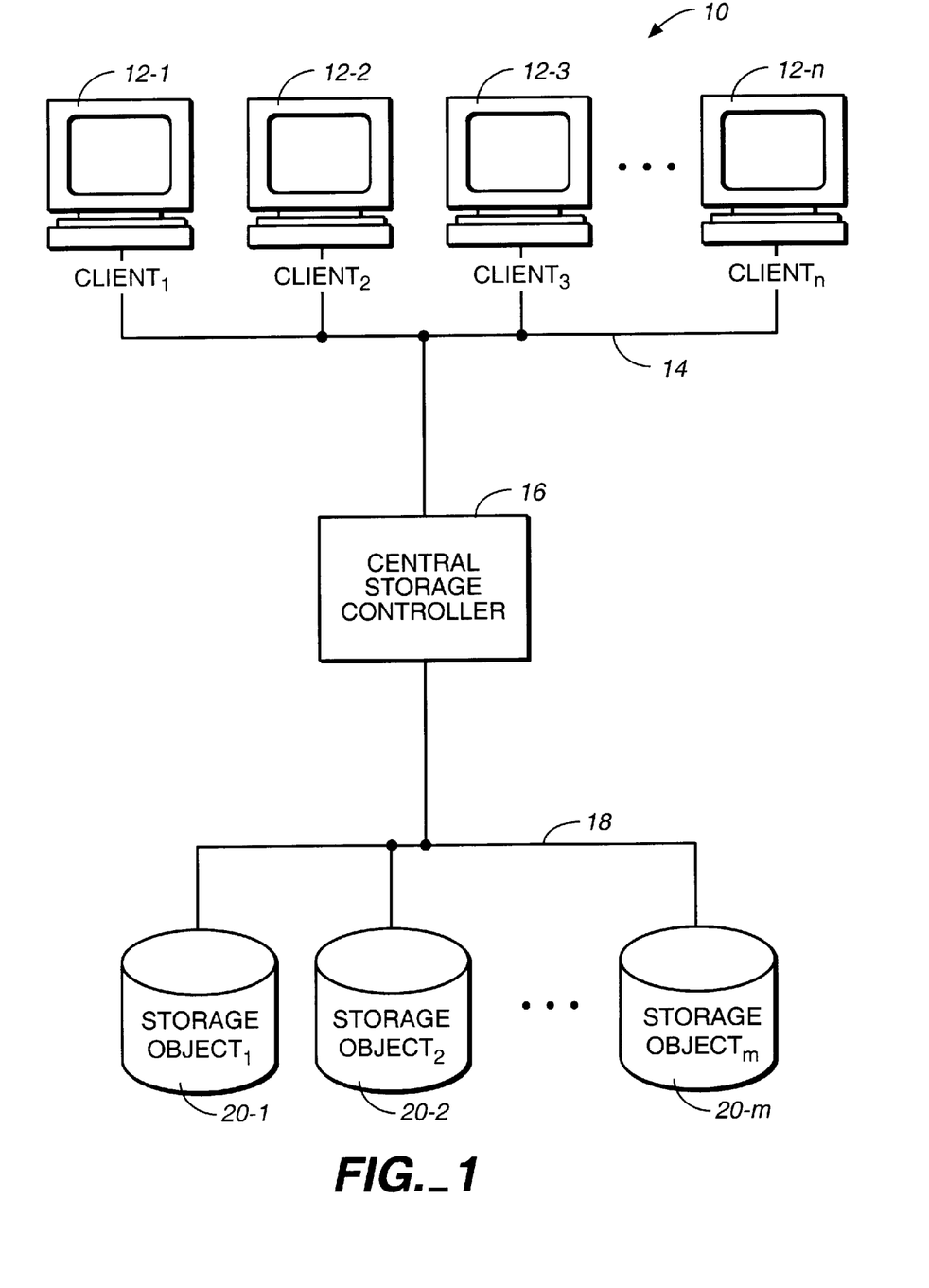
FIG. 1 is a system configuration diagram illustrating a central storage controller and its relationship and configuration to storage users and storage objects.

With reference to FIG. 1, a basic system configuration 10 is shown embodying the present invention. In particular, system configuration 10 suitably comprises a plurality of storage users or clients 12, a storage channel or network connection 14, a storage controller 16, a storage object connection 18, and a plurality of storage objects 20 preferably managed by storage controller 16. In accordance with a preferred embodiment of the invention, storage users 12 may comprise any suitable computer system or workstation capable of sending I/O or storage requests to a network server or storage controller, such as PCs, RISC-processor workstations, or the like.

Similarly, storage channel/network connection 14 may comprise any suitable connection configuration or network topology for connecting storage users 12 to a storage controller 16. For example, connection 14 may comprise an I/O interconnect such as a SCSI bus or Fibre Channel connection, or alternatively, connection 14 may comprise an Ethernet, FDDI/CDDI, Token Ring, Server Net or other suitable network connection.

As mentioned briefly above, storage controller 16 may comprise any suitable storage controller. For example, storage controller 16 may be a file server controller, a disk drive controller, or a RAID controller.

Figure 2:
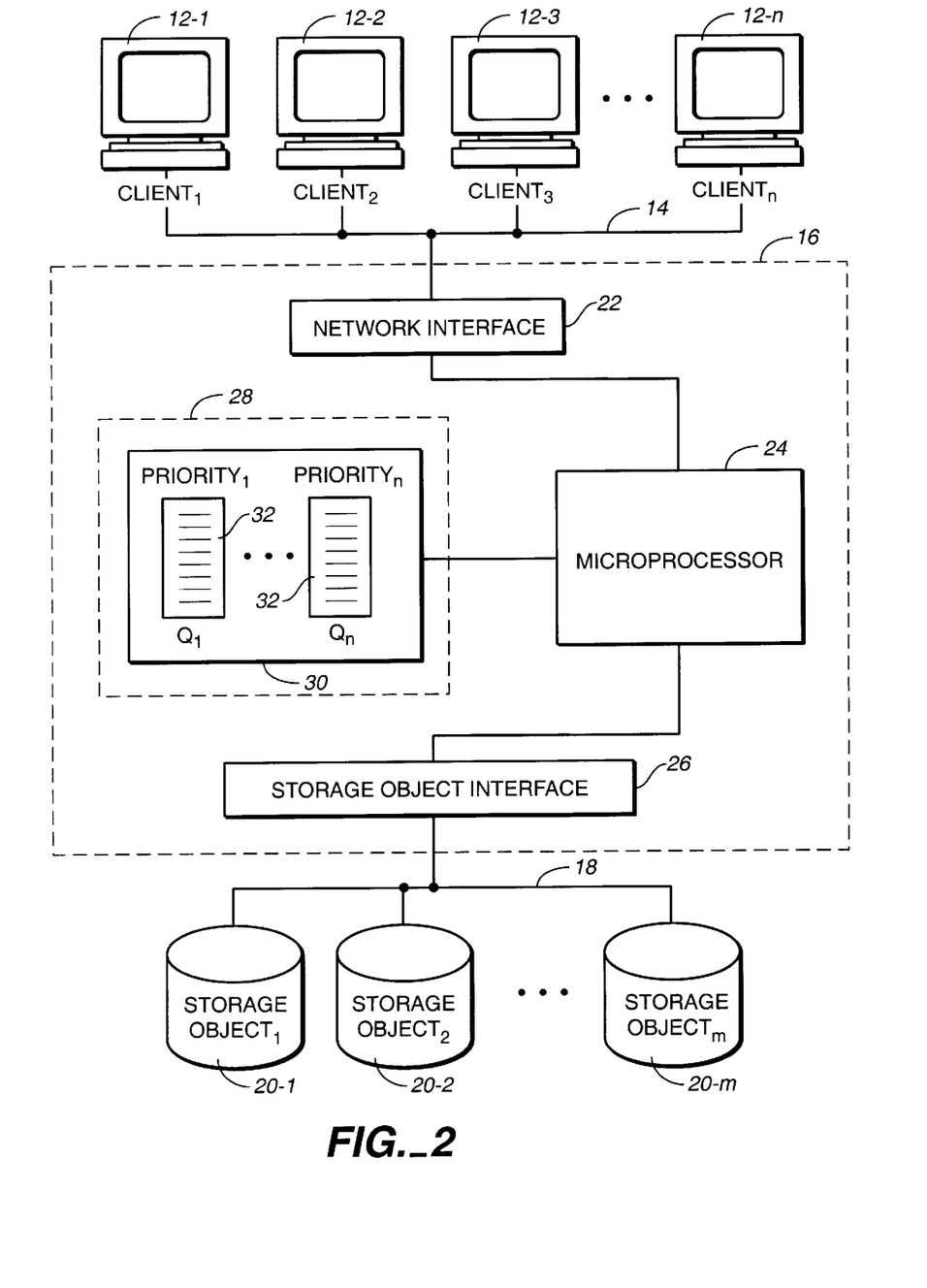
FIG. 2 is the system configuration diagram of FIG. 1 further illustrating the internal configuration of the central storage controller shown in FIG. 1.

Referring now to FIG. 2, an exemplary embodiment of a storage controller 16 is illustrated. In accordance with a preferred embodiment of the present invention, storage controller 16 suitably comprises a storage user interface 22, a processor 24, a storage object interface 26, and a memory 28.

Memory 28 preferably comprises at least one storage area 30 having one or more memory queues 32 for storing I/O requests from storage users 12. In accordance with this aspect of the invention, memory 28 may comprise any suitable storage device currently known in the art or hereinafter developed, such as DRAM, SRAM, Flash Memory, disk drives, or the like.

Storage user interface 22 preferably is configured to receive I/O requests from storage users 12 via storage channel/network connection 14. In accordance with this aspect of the invention, storage user interface 22 may be configured to interface with any type of connection configuration or topology, as discussed above. For example, if storage channel connection 14 is a SCSI bus linking storage users 12 to storage controller 16, storage user interface 22 will comprise a suitable SCSI interface. Similarly, if another connection or network configuration architecture is utilized storage user interface 22 will comprise a compatible interface. Also, as one skilled in the art will appreciate, storage user interface 22 may be different for different types of storage controllers. For example, a file server controller may utilize a different interface than a disk array controller because of the inherent differences in the operation of the different storage types (i.e. block input/output vs. file level control). In any event, in accordance with a preferred embodiment of the present invention, storage channel/network connection 14 comprises a SCSI bus architecture, and network interface 22 comprises a standard SCSI interface.

Similarly, storage object interface 26 is configured to communicate I/O requests from processor 24 to storage object(s) 20 via storage object connection 18. In accordance with a preferred embodiment of the present invention, storage object connection 18 comprises a SCSI bus architecture, and storage object interface 26 suitably comprises a standard SCSI interface. However, as with storage channel/network connection 14 and storage user interface 22, any suitable connection means may be utilized. For example, disk drive or RAID storage controllers likely will use high speed I/O interconnects, such as SCSI, Fibre Channel or the like, while file servers may communicate with a variety of storage objects, either directly or via a network connection such as Ethernet, FDDI/CDDI, Token Ring or the like.

Processor 24 may comprise any suitable computer processor, such as a microprocessor, microcontroller, or the like, which will prioritize and schedule requests from storage users for storage objects. In addition, while a preferred embodiment of the present invention is described herein with reference to a suitable processor, one skilled in the art will appreciate that the processing functions may be performed by other logic devices known in the art, such as ASIC or other hardwired logic devices.

Moreover, while the specific control of storage user interface 22 and storage object interface 26 is not specifically disclosed herein, one skilled in the art will appreciate that any suitable interface control device may be used. For example, each interface 22, 26 may include their own I/O processors, or processor 24 may control the interfaces. That is processor 24 may be a multitasking processor which handles the storage user I/O's, the storage object I/O's and the prioritization and scheduling tasks of the storage controller.

Figures 4, 5:
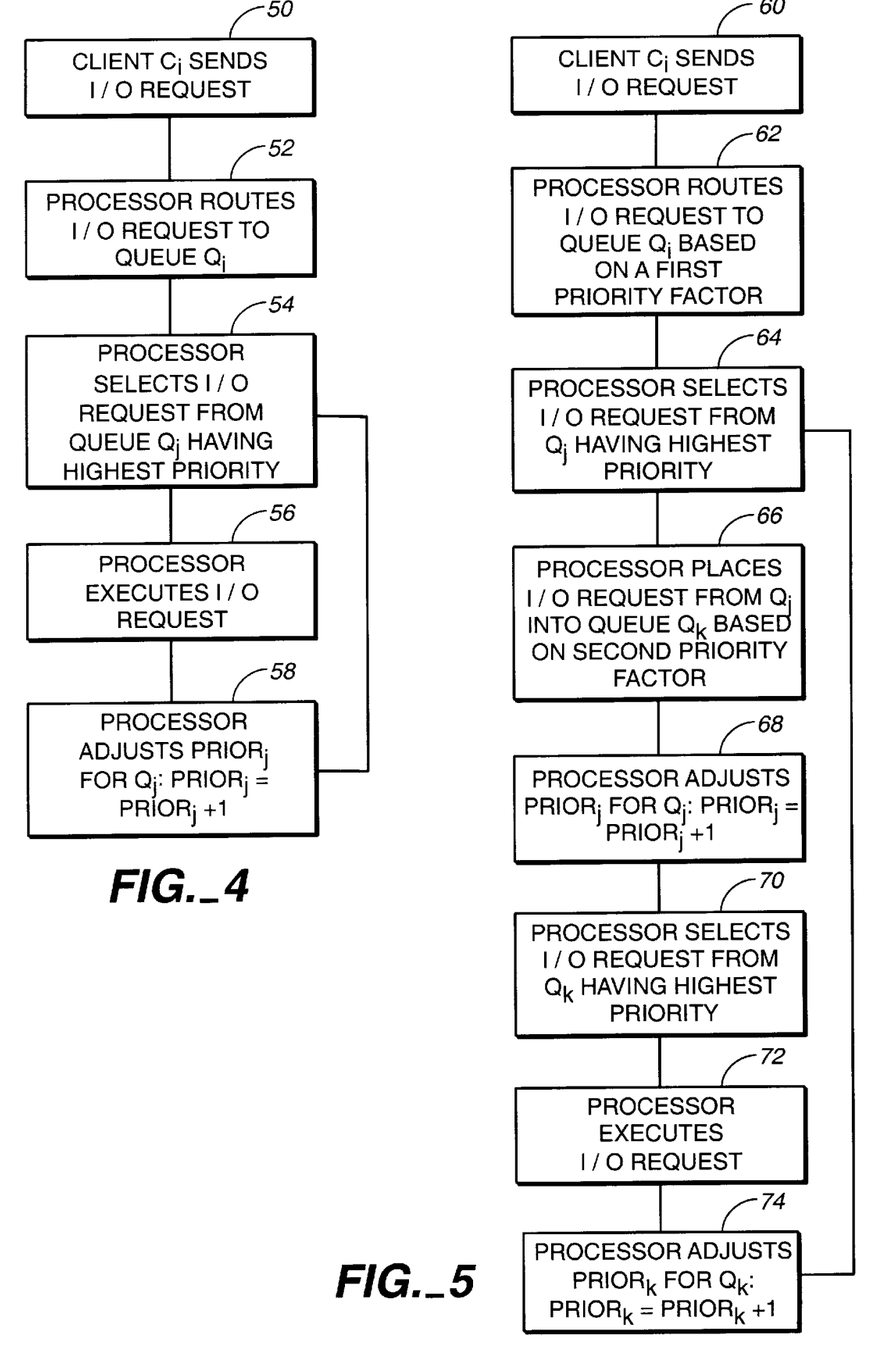
FIG. 4 is a block flow diagram illustrating a method for prioritizing I/O requests.
FIG. 5 is a block flow diagram illustrating a second method for prioritizing I/O requests.

Referring now to FIGS. 2 and 4, one method of prioritizing and processing I/O requests from storage users 12 will be described. In particular, one or more of storage users 12 first send I/O requests to processor 24 via storage channel/network connection 14 and storage user interface 22 (Block 50). Processor 24 receives the I/O requests and, in accordance with a predetermined prioritizing algorithm, preferably places them in memory 28, and more particularly in one of memory queues 32 within memory 28 (Block 52). For example, in accordance with one prioritizing scheme of the present invention, each of memory queues 32 are assigned a particular priority value, and processor 24 places I/O requests from storage users 12 in memory queues 32 associated with each storage user 12. That is, memory 28 has a number of memory queues 32, each having a particular priority value and configured to receive I/O request from clients 12 associated with that memory queue or having similar priority values as that queue.

In accordance with one embodiment of the present invention, memory 28 will comprise one memory queue 32 for each storage user 12. In this manner, I/O requests from a specific storage user 12 will be placed in a specific memory queue 32 associated with that storage user. However, as one skilled in the art will appreciate, other storage user/memory queue associations may be used. For example, if two or more storage users 12 have the same or similar priority values, I/O requests from those storage users may be placed in a single memory queue 32 configured to receive I/O requests from all storage users 12 having a particular priority or a priority value falling within a particular range.

After placing the I/O requests in the particular memory queues 32, processor 24 then retrieves I/O requests from memory queues 32 in accordance with a predetermined scheduling algorithm (e.g., highest priority first) (Block 54). Processor 24 then processes the I/O operation for the selected I/O request with the appropriate storage object(s) 20, and returns the results of the I/O operation back to the requesting storage user 12 (Block 56).

In accordance with one aspect of the present invention, after processor 24 executes an I/O operation from one of the memory queues 32, processor 24 preferably changes the priority value assigned to that memory queue 32 (Block 58). By changing the priority value of memory queue 32 after an I/O request has been processed from that queue, processor 24, and in particular the prioritizing and scheduling algorithm used by processor 24, ensures that I/O requests placed in queues with lower initial priorities eventually get processed. If the priority values are not adjusted, one or a small number of relatively high priority queues may consume substantially all of the processing resources, preventing I/O requests in other lower priority queues from being processed. In addition, as discussed in more detail below, processor 24 periodically may perform a decay function on all the memory queues, changing the priority of all the queues in accordance with a predetermined decay function algorithm.

After processor 24 adjusts the priority of memory queue 32 from which the last I/O request was processed, processor 24 returns to block 54 to select another I/O request from one of memory queues 32.

While the above discussion describes the operation of processor 24 in somewhat of a sequential manner, one skilled in the art will appreciate that processor 24 may perform many tasks virtually simultaneously, and may perform some of the tasks in different orders. For example, processor 24 may receive, prioritize and place an I/O request in memory 28 while it is also processing an I/O request from another storage user 12 or from the same storage user having multiple requests. In any event, the operation of processor 24 is not limited to the specific operating order and method described herein.

Moreover, while the present invention is described herein as processing each I/O request directly with a storage object, one skilled in the art will appreciate that caching, write-back, and other time and system resource saving techniques may be utilized. For example, if one or more blocks of data are accessed frequently by users, that data may be maintained in a cache memory and accessed directly from there. This type of configuration will prevent a large number of processor intensive I/O operations to the same storage object. Similarly, instead of holding a storage user until the storage controller completes a write operation, the processor may use write-back techniques that release the storage user once the write data is received from the storage user.

Referring still to FIG. 2, one particular prioritizing scheme in accordance with the present invention will be described. In particular, each storage user 12 preferably is assigned a fixed relative priority value. In accordance with this example, Fi will be used to represent the fixed priority value associated with a particular storage user i. Furthermore, a dynamic priority value Pi is also tracked for each storage user i. Finally a numeric value UPi is maintained for each storage user i. This value represents a "usage penalty" that is incurred each time an I/O request for a storage user i is processed by storage controller 16. For Pi, Fi and UPi, numerically larger values correspond to less favorable scheduling opportunities for storage user i. The dynamic priority value Pi for a given storage user i is calculated using the formula Pi=Fi+UPi.

When processor 24, and in particular the scheduler of processor 24 is selecting the memory queue 32 from which to extract the next idle request for processing, processor 24 preferably chooses the memory queue 32 associated with the storage user i whose dynamic priority value Pi is numerically lowest. To avoid confusion, numerically lower/lowest priority values are "better/best" and numerically higher/highest priority values are "worse/worst".

To further clarify the calculation of priority values on a per user basis, two other considerations will be addressed. First, as discussed above, each time a storage user's memory queue is selected for service, processor 24 adjusts the usage penalty UPi for that user so that the storage user's dynamic priority Pi is also adjusted. For example, after processor 24 selects an I/O request from a memory queue 32 associated with a storage user i, processor 24 adjusts the usage penalty UPi as follows: UPi=UPi+1. Accordingly, since the dynamic priority value Pi for user i is Pi=Fi+UPi, the dynamic priority value Pi is also adjusted when the usage potential is adjusted. This process serves to worsen the priority value for storage user i during the next scheduling interval, and thus penalizes the user and prevents it from monopolizing the storage controller resources.

Second, as also discussed briefly above, at regular periodic intervals, processor 24 may update the usage potential for every storage user by applying a "decay factor". For example, one such decay factor algorithm may be UPi=UPi*L/(L+1). By applying a decay factor, the usage penalty values (UPi) which are accrued by each user are reduced over time. In accordance with this particular prioritization scheme the value L is a dynamically calculated "load factor" that is calculated as a moving average of the number of active requests being executed by processor 24 in the most recent fixed time period. When L is large, indicating that the storage controller is very busy, usage penalties decay slowly. Similarly, when L is relatively small, indicating that the storage controller is essentially idle, usage penalties decay rapidly. Finally, the dynamic priority value Pi for each storage user typically is recalculated on a regular basis to account for changes in usage penalties UPi.

In accordance with this particular prioritization algorithm discussed herein, the fixed priority values Fi generally are assigned so as to institute a fixed relative prioritization scheme among storage users. For example, if F=5 then F2=10, then F1 is clearly associated with a "preferred user", since F1 has a better priority value than F2; these values will exert the desired influence on the priority calculations of P1 and P2.

The fixed priority values assigned to individual storage users are conveyed to storage controller 24 via any of a variety of means. Storage controller 24 typically is not concerned with how the priority values have been established or communicated, but merely how the priority values are used in the currently activated priority algorithm. Priority values may be assigned based on the identity of a storage user, the Quality of Service (QoS) provided on a storage users communication link, or any number of other factors. The priority values can be conveyed to storage controller 24 by SCSI mode select commands for block-access storage devices, auxiliary network messages for NFS or SMB file servers, or data structures passed from a network interface which has established a Quality of Service (QoS) for an individual storage user.

Figure 6:
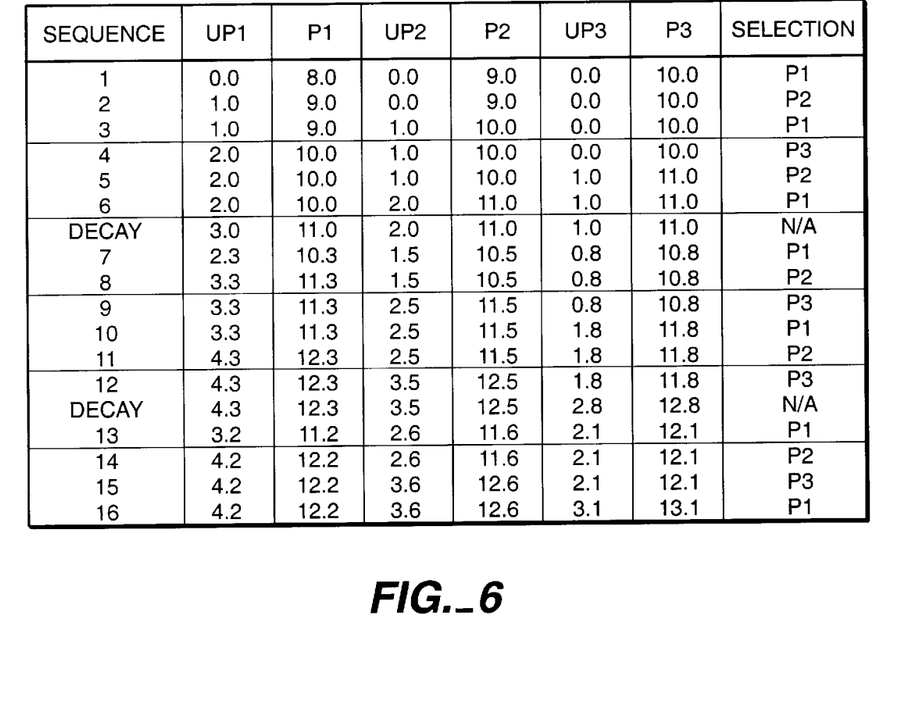
FIG. 6 is a table illustrating a number of scheduling sequences preferred by one embodiment of the present invention.

Referring now to FIG. 6, a specific example illustrating the prioritization algorithm discussed above will now be described. The present example disclosed herein assumes the existence of three storage users having the following fixed priority values: F1=8, F2=9 and F3=10. Also, in accordance with this example, a static load factor of L=3 is assumed. The table illustrated in FIG. 6 tracks the dynamic priority values P for each storage user. The table also identifies the best dynamic priority value Fi at each scheduling interval, thus indicating the storage user whose memory queue is selected for service. Note also that some entries in the table shown in FIG. 6 are illustrated as "decay" intervals. These decay intervals are times at which the processor/scheduler recognizes the need to apply the decay factor to the usage penalty values UPi for each storage user.

As can be seen from the table in FIG. 6, storage users 1's memory queue was selected for seven operations, storage user 2's memory queue was selected five operations, and storage user 3's memory queue was selected for four operations. This pattern coincides with the fixed relative priority values for the three storage users.

As shown in FIG. 6, for sequence 1, storage user 1 has a usage penalty of 0 (UP1=0) and a dynamic priority value of 8 (Pi=8); storage user 2 has a usage penalty of 0 (UP2=0) and a dynamic priority value of 9 (P2=9); and storage user 3 has a usage penalty of 0 (UP3=0) and a dynamic priority value of 10 (P3=10). Because storage user 1 has the lowest dynamic priority value (P1=8), the processor selects an I/O request from storage user 1's memory queue. After processing the I/O request for storage user 1, the processor then increments storage user 1's usage penalty to UP1=1, thus increasing storage user 1's dynamic priority value to P1=9.

At sequence number 2, storage user 1 and storage user 2 both have dynamic priority values of 9. In accordance with this example, because the processor previously processed an I/O request for storage user 1, the processor now will process an I/O request for storage user 2, thus breaking the tie. However, one skilled in the art will appreciate that any suitable tie-breaking method may be used to break the tie between storage user 1 and storage user 2; for example a FIFO tie-breaking scheme may be used.

Since the processor selected and processed an I/O request from the memory queue for storage user 2, the processor increments storage user 2's usage penalty by one (UP2=1). Accordingly, storage user 2's dynamic priority is also incremented (P2=10). Thus, at sequence number 3, storage user 1 again has the lowest dynamic priority value (P1=9), and so the processor processes and I/O request from the memory queue of storage user 1. This process continues as illustrated.

As mentioned above, at certain sequences, the processor executes a decay factor algorithm. In the illustrated example, the first decay factor algorithm occurs between sequence six and sequence seven. As mentioned previously, the decay factor algorithm for this particular example is UPi=UPi*L/(L+1). Thus, the usage penalty for storage user 1 will be altered as follows: UP1=3*3/4=2.3. Similarly, the usage penalty for storage user 2 is: 2*3/4=1.5 and the usage penalty for storage user 3 is: UP3=1*3/4=0.8. After the decay function has been applied, the processor proceeds again with scheduling the I/O requests as before.

In accordance with another aspect of the present invention, any number of scheduling algorithms may be utilized to select the I/O requests from memory 28, and in particular memory queues 32. For example, processor 24 may utilize the round-robin or FIFO scheduling algorithms, or a scheduling algorithm similar to that utilized by the UNIX operating system may be used. The scheduling algorithm described in the example above is a variation of the UNIX scheduling scheme. For a more detailed discussion of the UNIX operating systems scheduling scheme see, for example, "The Design and Implementation of the 4.3 BSD UNIX Operating System"; S Leffler, M. McKusick, M. Karel, and J. Quarterman; Addison-Wesley, 1989; ISBN 0-201-06196-1, which is incorporated herein by reference.

In addition, while the above discussion describes a prioritization scheme in which I/O requests are prioritized in accordance with a priority value assigned to storage users 12, any number of priority schemes may be utilized. For example, I/O requests may be prioritized by storage user priority, storage object priority, job priority or a combination of all of these factors. In the case of storage object priority, each storage object will be associated with a particular memory queue, and will be assigned fixed priority, usage penalty and dynamic priority values as discussed above. Similarly, as one skilled in the art will appreciate, the user of the system may change the priority schemes and/or algorithms used by the system, and the user may change the priorities assigned to the storage users and/or storage objects, both prior to I/O processing and dynamically during I/O processing. In accordance with this aspect of the invention, the user can change the storage user and/or storage object priorities manually via a user interface, or the priority values may be downloaded to the system and in particular to the storage controller by tape, disk or CD, or through a network environment. In any event, the system is dynamically configurable.

Figure 3:
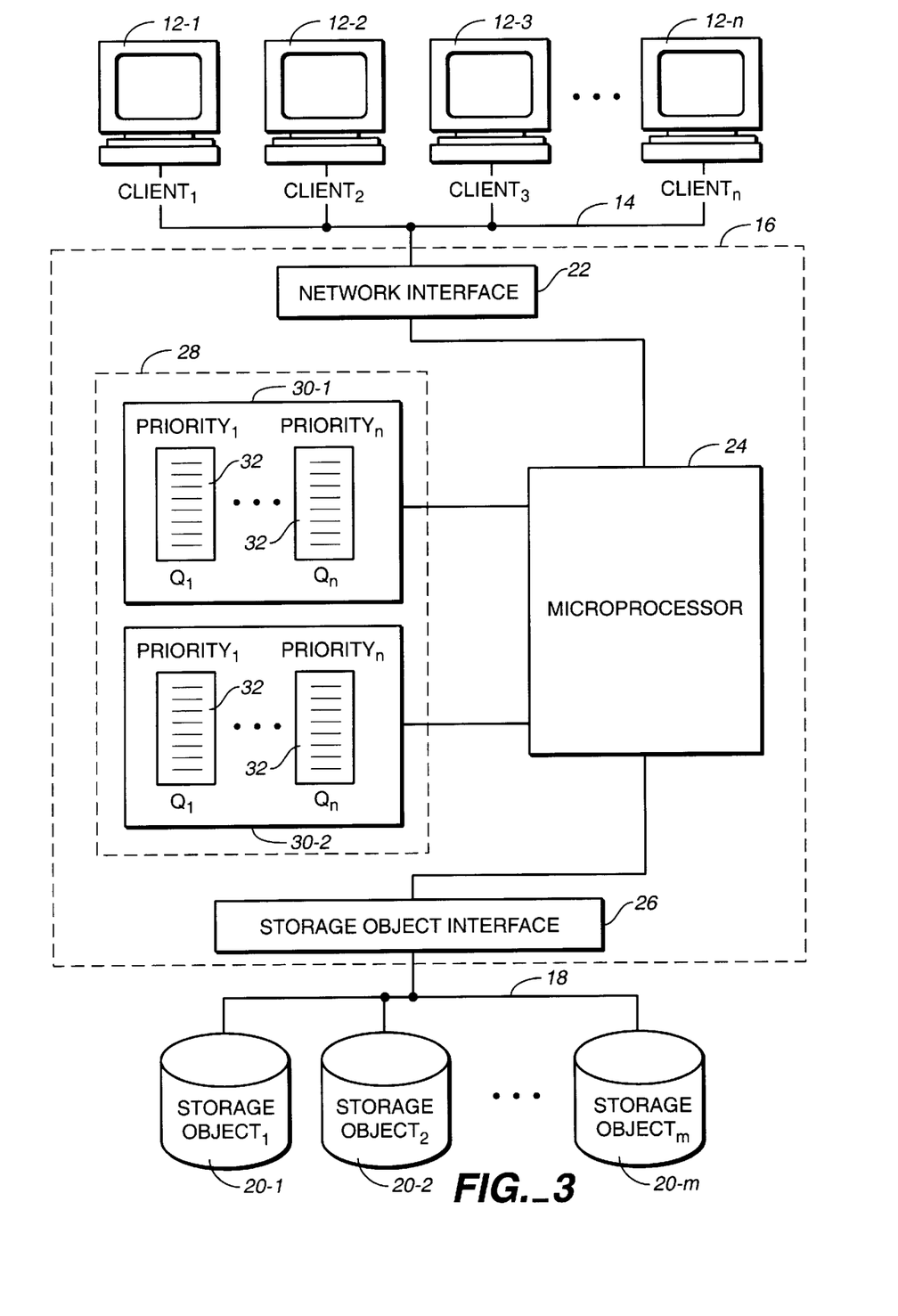
FIG. 3 is the system configuration diagram of FIGS. 1 and 2 further illustrating a plurality of memory areas having a plurality of memory queues.

In accordance with another embodiment of the present invention, and referring to FIGS. 3 and 5, a plurality of prioritizing schemes may be used to prioritize and schedule the I/O requests. In accordance with this embodiment of the invention and as illustrated in FIG. 5, I/O requests from storage users 12 are first prioritized by storage user and then by storage object 20. More particularly, one or more of storage users 12 first send I/O requests to processor 24 (Block 60). Processor 24 receives the I/O requests and determines, using a first prioritization factor, in which one of memory queues 32 in a first storage area 30-1 it should place the I/O request (see FIG. 3). In accordance with a preferred embodiment of the invention, the first prioritization factor is storage user priority, and processor 24 places the I/O requests in memory queues 32 in first storage area 30-1 associated with the particular storage user 12 (Block 62). As discussed previously, particular memory queues 32 are configured to receive I/O requests from particular storage users 12 and are assigned priority values which are periodically adjusted during processing.

After placing one or more I/O requests in the particular memory queues 32 in first storage area 30-1, processor 24 then retrieves I/O requests from the memory queues 32 in accordance with a predetermined scheduling algorithm (e.g., highest priority first) (Block 64), and determines, using a second prioritization factor, in which one of memory queues 32 in a second storage area 30-2 it should place the I/O requests. In accordance with the illustrated embodiment of the present invention, the second prioritization factor is storage object priority, and processor 24 places I/O requests in memory queues 32 associated with the particular storage objects 20 (Block 66).

After processor 24 removes an I/O request from one of the memory queues in first storage area 30-1, processor 24 preferably changes the priority value assigned to that memory queue 32 (Block 68).

Next, processor 24 preferably retrieves an I/O request from memory queues 32 in second storage area 30-2 in accordance with a predetermined scheduling algorithm (Block 70), and processes the I/O operation for the selected I/O request with the appropriate storage object(s) 20 (Block 72). The processor then returns the results of the I/O operation back to the requesting client 12. As with the memory queues 32 in first storage area 30-1, processor 24 preferably changes the priority value assigned to memory queue 32 in second storage area 30-2 from which the last I/O request was taken (Block 74). In addition, as mentioned above, processor 24 periodically may perform a decay function on all the queues, changing the priority of all the memory queues in accordance with a predetermined decay function algorithm.

After processor 24 adjusts the priority of memory queue 32 in second storage area 30-2, processor 24 returns to block 64 to select another I/O request from one of the memory queues 32 in accordance with the prioritization and scheduling algorithm.

Again, as discussed above with reference to FIG. 4, the operation of processor 24 is not necessarily limited to the specific order of operation described herein, which is merely an example of a preferred embodiment. For example, processor 24 may prioritize and store several I/O requests in first storage area 30-1 before it processes any I/O operations for I/O requests in second storage are 30-2. Similarly, processor 24 may change the priority of memory queues 32 in first storage area 30-1 and second storage area 30-2 at any time throughout the process. In any event, the present invention is not limited to the illustrated embodiment.

In conclusion, the present invention provides a novel method and apparatus for prioritizing and scheduling I/O requests from one or more clients to one or more storage objects. While a detailed description of presently preferred embodiments of the invention have been given above, various alternatives, modifications, and equivalents will be apparent to those skilled in the art. For example, any suitable storage controller may be utilized, and any number of different prioritization and scheduling schemes and algorithms may be used without varying from the spirit of the invention. Therefore, the above description should not be taken as limiting the scope of the invention which is defined by the appended claims.

What is claimed is:

1. A storage controller configured to prioritize and schedule I/O requests from a plurality of clients to at least one storage object, comprising:

processing means for processing I/O requests from said plurality of clients in a prioritized order;

first interface means for sending and receiving data between said clients and said processing means; and second interface means for sending and receiving data between said processing means and said at least one storage object;

said processing means being configured to receive I/O requests from said clients via said first interface means, prioritize and schedule said I/O requests based on a priority assigned to each of said clients, conduct an I/O operation with said at least one storage object via said second interface means for an I/O request from a client having a highest priority, communicate results from said I/O operation back to the client which initiated the I/O request processed by the I/O operation, and change the priority assigned to the client which initiated the I/O request processed by the I/O operation.

2. The storage controller as recited in claim 1 wherein said storage controller is a disk array controller.

3. The storage controller as recited in claim 1 wherein said storage controller is a file server.

4. The storage controller as recited in claim 1 wherein said processing means periodically changes said priority assigned to each one of said plurality of clients in accordance with a priority decay algorithm.

5. The storage controller as recited in claim 1 further comprising a third interface means for receiving priority value information.

6. A storage controller configured to prioritize and schedule I/O requests from one or more clients to a plurality of storage objects, comprising:

processing means for processing I/O requests from said one or more clients in a prioritized order;

first interface means for sending and receiving data between said one or more clients and said processing means; and second interface means for sending and receiving data between said processing means and said plurality of storage object;

said processing means being configured to receive I/O requests from said one or more clients via said first interface means, prioritize and schedule said I/O requests based on a priority assigned to each of said storage objects, conduct an I/O operation with one or more of said storage objects via said second interface means for an I/O request directed to a storage object having a highest priority, communicate results from said I/O operation back to the client which initiated the I/O request processed by the I/O operation, and change the priority assigned to the one or more storage objects with which the I/O operation was conducted.

7. A storage controller configured to prioritize and schedule I/O requests from a plurality of clients to at least one storage object, comprising:

a memory having a plurality of memory queues;

processing means for processing I/O requests from said plurality of clients in a prioritized order;

first interface means for sending and receiving data between said clients and said processing means; and second interface means for sending and receiving data between said processing means and said at least one storage object;

said processing means being configured to receive I/O requests from said clients via said first interface means, place each one of said I/O requests into one of said plurality of memory queues based on a priority of said I/O request, remove an I/O request having a selected priority from one of said plurality of memory queues, conduct an I/O operation with said at least one storage object via said second interface means for the removed I/O request, and communicate results from said I/O operation back to the client which initiated the I/O request.

8. The storage controller as recited in claim 7 wherein each one of said memory queues are assigned a priority, and at least one of said plurality of memory queues is configured to receive I/O requests from at least one of said plurality of clients, and wherein said processing means selects an I/O request from one of said plurality of memory queues based on the priority assigned to each of said plurality of memory queues.

9. The storage controller as recited in claim 10 wherein each of said plurality of clients is assigned a priority, and wherein said processing means places I/O requests from a client having a certain priority into a memory queue having a similar priority.

10. The storage controller as recited in claim 7 wherein each one of said memory queues are assigned a priority, and at least one of said plurality of memory queues is configured to receive I/O requests directed to said at least one storage object, and wherein said processing means selects an I/O request from one of said plurality of memory queues based on the priority assigned to each of said plurality of memory queues.

11. The storage controller as recited in claim 10 wherein each of said at least one storage objects is assigned a priority, and wherein said processing means places I/O requests directed to a storage object having a certain priority into a memory queue having a similar priority.

12. The storage controller as recited in claim 7 wherein each one of said plurality of clients is assigned a first priority, and each of said at least one storage objects is assigned a second priority, and wherein said processing means calculates an I/O priority for each of said I/O requests based on said first priority and said second priority and places each of said I/O requests into a memory queue having a similar priority.

13. A method for prioritizing and scheduling I/O requests from a plurality of clients to one or more storage objects, comprising the steps of:

receiving via a first communication interface I/O requests from said plurality of clients;

prioritizing and scheduling said I/O requests based on a priority assigned to each of said clients;

conducting an I/O operation with said one or more storage objects for an I/O request from a client having a highest priority;

communicating results from said I/O operation back to the client which initiated the I/O request processed by the I/O operation; and changing the priority assigned to the client which initiated the I/O request processed by the I/O operation.

14. The method as recited in claim 13 further comprising the step of periodically changing said priority assigned to each one of said plurality of clients in accordance with a priority decay algorithm.

15. A system for scheduling I/O requests to at least one storage object from a plurality of clients, comprising:

a processor;

a client interface configured to facilitate communications between said plurality of clients and said processor;

a storage object interface configured to facilitate communications between said processor and said at least one storage object; and a memory having a plurality of memory queues;

wherein one or more of said plurality of clients send I/O requests to said processor via said client interface, said processor receives said I/O requests and places each one of said I/O requests in one of said plurality of memory queues based on a priority of said I/O requests, and at an approprate time said processor removes an I/O request having a selected priority value from one of said plurality of memory queues and conducts an I/O operation with said at least one storage object.

16. The system as recited in claim 15 wherein said client interface comprises a SCSI interface.

17. The system as recited in claim 15 wherein said client interface is ATM, CDDI, Fibre Channel, FDDI, Ethernet, Server Net or Token Ring.

18. The system as recited in claim 15 wherein said storage object interface comprises a SCSI interface.

19. The system as recited in claim 15 wherein said storage object interface is ATM, CDDI, Fibre Channel, FDDI, Ethernet, Server Net or Token Ring.

20. The system as recited in claim 15 wherein each one of said plurality of memory queues are assigned a priority, and at least one of said plurality of memory queues are configured to receive I/O requests from at least one of said plurality of clients, and wherein said processor selects an I/O request from one of said plurality of memory queues based on the priority assigned to each of said plurality of memory queues.

21. The storage controller as recited in claim 20 wherein each of said plurality of clients is assigned a priority, and wherein said processing means places I/O requests from a client having a certain priority into a memory queue having a similar priority.

22. The system as recited in claim 20 wherein said processor changes said priority assigned to a memory queue after said processor conducts an I/O operation for an I/O request from said memory queue.

23. The system as recited in claim 20 wherein said processor periodically changes said priority assigned to each one of said plurality of memory queues in accordance with a priority decay algorithm.

24. The system as recited in claim 15 wherein each one of said plurality of memory queues are assigned a priority, and at least one of said plurality of memory queues are configured to receive I/O requests directed to storage objects, and wherein said processor selects an I/O request from one of said plurality of memory queues based on the priority assigned to each of said plurality of memory queues.

25. The storage controller as recited in claim 24 wherein each of said at least one storage objects is assigned a priority, and wherein said processing means places I/O requests directed to a storage object having a certain priority into a memory queue having a similar priority.

26. The system as recited in claim 15 wherein each one of said plurality of clients is assigned a first priority, and each of said at least one storage objects is assigned a second priority, and wherein said processor calculates an I/O priority for said I/O requests based on said first priority and said second priority and places each of said I/O requests into a memory queue having a similar priority.

27. The system as recited in claim 15 wherein said system is configured to schedule I/O requests directed to a disk array.

28. The system as recited in claim 15 wherein said system is configured to schedule I/O requests directed to a file server.

29. The system as recited in claim 15 further comprising a priority value interface configured for receiving priority values from an external source.

* * * * *